United States Patent
Prakash et al.

(10) Patent No.: US 9,674,331 B2
(45) Date of Patent: *Jun. 6, 2017

(54) TRANSMITTING DATA FROM AN AUTOMATED ASSISTANT TO AN ACCESSORY

(71) Applicant: Apple Inc., Cupertino, CA (US)

(72) Inventors: Jude A. Prakash, Santa Clara, CA (US); Shailesh Rathi, San Jose, CA (US); Daniel De Rocha Rosario, San Francisco, CA (US); Sylvain R. Y. Louboutin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,800

(22) Filed: Oct. 1, 2012

(65) Prior Publication Data

US 2013/0332172 A1 Dec. 12, 2013

Related U.S. Application Data

(60) Provisional application No. 61/657,560, filed on Jun. 8, 2012.

(51) Int. Cl.
*G10L 15/22* (2006.01)
*H04M 1/60* (2006.01)
*H04M 1/725* (2006.01)

(52) U.S. Cl.
CPC ....... *H04M 1/6075* (2013.01); *H04M 1/7253* (2013.01); *H04M 1/72527* (2013.01);
(Continued)

(58) Field of Classification Search
CPC .................................................... G10L 15/22
(Continued)

(56) References Cited

U.S. PATENT DOCUMENTS

| 6,081,724 | A * | 6/2000 | Wilson | H04M 1/6075 455/462 |
| 6,714,802 | B1 * | 3/2004 | Barvesten | H04M 1/0254 455/550.1 |

(Continued)

FOREIGN PATENT DOCUMENTS

| CN | 101326479 A1 | 12/2008 |
| CN | 201177970 Y | 1/2009 |

(Continued)

OTHER PUBLICATIONS

"VlingoVoice: Distracted Driving Solution with Vlingo Incar," Oct. 6, 2010, [online], retrieved from the internet [retrieved on Oct. 23, 2013], <URL: http://www.youtube.com/watch?v=Vqs8XfXxgz4>, 1 page.

(Continued)

*Primary Examiner* — Pierre-Louis Desir
*Assistant Examiner* — Forrest F Tzeng
(74) *Attorney, Agent, or Firm* — Kilpatrick Townsend & Stockton LLP

(57) ABSTRACT

An accessory is configured to receive a request. The accessory transmits information associated with the request to a portable device. An automated assistant application executed by the portable device can interpret the request and provide a report. The portable device can transmit the report to the accessory. The report may include one or more results determined by the automated assistant.

26 Claims, 6 Drawing Sheets

(52) U.S. Cl.
CPC ......... *G10L 15/22* (2013.01); *H04M 2250/56* (2013.01); *H04M 2250/74* (2013.01)

(58) Field of Classification Search
USPC .......................................... 704/275, E21.001
See application file for complete search history.

(56) References Cited

U.S. PATENT DOCUMENTS

| | | | |
|---|---|---|---|
| 7,710,654 B2 | 5/2010 | Ashkenazi | |
| 8,078,787 B2* | 12/2011 | Lydon | G06F 13/387 710/105 |
| 8,611,930 B2* | 12/2013 | Louboutin | G06Q 30/0261 455/414.3 |
| 8,799,527 B2* | 8/2014 | Mullins | H04M 1/0274 710/16 |
| 2003/0220988 A1* | 11/2003 | Hymel | G06F 13/385 709/220 |
| 2006/0262103 A1 | 11/2006 | Hu et al. | |
| 2007/0099592 A1* | 5/2007 | Thome | H04B 1/3877 455/348 |
| 2010/0076994 A1* | 3/2010 | Soroca | G06F 17/30749 707/769 |
| 2010/0201567 A1* | 8/2010 | Lydon | H04W 8/24 342/357.22 |
| 2010/0234051 A1* | 9/2010 | Holden | H04B 1/3805 455/466 |
| 2010/0245585 A1 | 9/2010 | Fisher | |
| 2011/0066634 A1* | 3/2011 | Phillips | G10L 15/22 707/769 |
| 2012/0016678 A1* | 1/2012 | Gruber | G06F 17/3087 704/275 |
| 2012/0042343 A1* | 2/2012 | Laligand | H04N 21/234336 725/53 |
| 2012/0064922 A1 | 3/2012 | Podoloff et al. | |
| 2012/0163620 A1* | 6/2012 | Zhang | H04B 5/06 381/79 |
| 2012/0271640 A1* | 10/2012 | Basir | H04M 1/72552 704/275 |
| 2013/0012241 A1* | 1/2013 | Podoloff | G06F 1/1632 455/456.6 |
| 2013/0110505 A1* | 5/2013 | Gruber | G06F 17/3087 704/9 |
| 2013/0111348 A1* | 5/2013 | Gruber | G06F 17/3087 715/727 |
| 2014/0365694 A1* | 12/2014 | Bolton | H04W 80/02 710/106 |

FOREIGN PATENT DOCUMENTS

| | | |
|---|---|---|
| EP | 1909069 A1 | 4/2008 |
| WO | 2007044900 A2 | 4/2007 |

OTHER PUBLICATIONS

Keleher, Erin, "Vlingo Announces Vlingo InCar, The First and Only Completely Hands Free Solution to Send and Respond to Messages, Make Calls, and Get Directions While Driving," Vlingo Press Release, Oct. 7, 2010, [online], retrieved from the internet [retrieved on Oct. 23, 2013] <URL:http://www.vlingo.com/sites/default/files/Vlingo%20Handes%20Free%20App%20ReleaseFinal.pdf> , 2 pages.
International Search Report and Written Opinion mailed Nov. 6, 2013 in PCT/US2013/040770, 15 pages.
Office Action from Chinese Patent Application No. 201380028151.1, dated Aug. 20, 2015, 20 pages.
Office Action for S. Korean Patent Application No. 10-2014-7033082 dated Nov. 18, 2015, 9 pages.
Notice of Last Preliminary Rejection for Korean Patent Application No. 10-2014-7033082 dated Jun. 20, 2016, 11 pages.
Office Action for Chinese Patent Application 201380028151.1 dated Apr. 11, 2016, 9 pages.
Third Office Action received by the Chinese Patent Office in Chinese Patent Application No. 201380028151.1, dated Sep. 28, 2016; 6 pages.
International Preliminary Report on Patentability for International PCT Application No. PCT/US2013/040770, mailed Dec. 18, 2014, 11 pages.

* cited by examiner

| Message | Data |
|---|---|
| ActivateAutoAsst | (none) |
| GetAutoAsstState | (none) |
| SendAccMode | Mode information for accessory |
| SendRequest | User input received at user interface of accessory |
| SelectResult | Result from report generated by automated assistant |
| DeactivateAutoAsst | (none) |

FIG. 4A

| Message | Data |
|---|---|
| SendAutoAsstState | State parameter value |
| GetAccMode | (none) |
| SendGUI | Automated Assistant Graphical User Interface for display by the accessory |
| SendReport | Report Data |
| SendResultResponse | Information associated with selected result, status associated with selected result |

FIG. 4B

TRANSMITTING DATA FROM AN AUTOMATED ASSISTANT TO AN ACCESSORY

CROSS-REFERENCE TO RELATED APPLICATIONS

The present application claims priority from and is a nonprovisional application of U.S. Provisional Application No. 61/657,560, entitled "TRANSMITTING DATA FROM AN AUTOMATED ASSISTANT TO AN ACCESSORY" filed Jun. 8, 2012, the entire contents of which are herein incorporated by reference for all purposes.

BACKGROUND

Portable electronic devices allow users to store a variety of information and access information via the Internet or other sources. Various services related to storing and accessing information may be provided on a portable electronic device. For example, an automated assistant application may be implemeneted on a portable electronic device to facilitate user interaction with the electronic device and to help the user access information available locally on the portable electronic device or from remote sources.

A user may wish to utilize a service available on the portable electronic device at a time when it is not convenient for the user to directly manipulate the interface of the portable electronic device. In some cases, such as when a user is operating a vehicle, use of a portable electronic device may be restricted by law. Various accessories may provide user interfaces that are adapted for use in particular environments. For example, an accessory such as a head unit in a vehicle may provide a display that is easily viewable by a driver. The head unit may also have user input devices that are convenient for the driver to use while operating the vehicle.

BRIEF SUMMARY

The present disclosure relates generally to using an interface of an accessory to retrieve information using an application available on a portable electronic device. In particular, a request received at the user interface of an accessory can be transmitted to a portable electronic device and an automated assistant application running on the portable electronic device may generate a report in response to the request.

Embodiments of the present invention provide methods and apparatus for an accessory to access an automated assistant feature of a portable electronic device. An exemplary embodiment provides an accessory that receives a voice request. The accessory can transmit data associated with the voice request to a portable electronic device. The accessory can receive a report responsive to the voice request from the portable electronic device. The report may be generated by an automated assistant of the portable electronic device. The accessory can present the report to a user.

Another aspect of the present invention relates to an accessory. The accessory may have a controller. A user interface connected to the controller can include an input device configured to receive a voice request. A communication interface connected to the controller can transmit data associated with the voice request to a portable electronic device and receive a report responsive to the voice request from the portable electronic device. An output device of the user interface can present the report to a user.

A further aspect of the present invention relates to a portable electronic device. The portable electronic device can have a processor connected to a storage device. An automated assistant may include a plurality of instructions stored by the storage device and executable by the processor. An accessory interface of the portable electronic device is connected to the processor. The accessory interface can receive data associated with a request from the accessory. The automated assistant can determine a task associated with the request, perform the task, and generate a report including one or more results determined by performing the task. The portable electronic device can send the report to the accessory.

To better understand the nature and advantages of the present invention, reference should be made to the following description and the accompanying figures. It is to be understood, however, that each of the figures is provided for the purpose of illustration only and is not intended as a definition of the limits of the scope of the present invention.

BRIEF DESCRIPTION OF THE DRAWINGS

FIG. 4A is a table listing messages that can be sent from an accessory to a portable device, according to an embodiment of the present invention.

FIG. 4B is a table listing messages that can be sent from a portable device to an accessory, according to an embodiment of the present invention.

DETAILED DESCRIPTION

Figure 1:
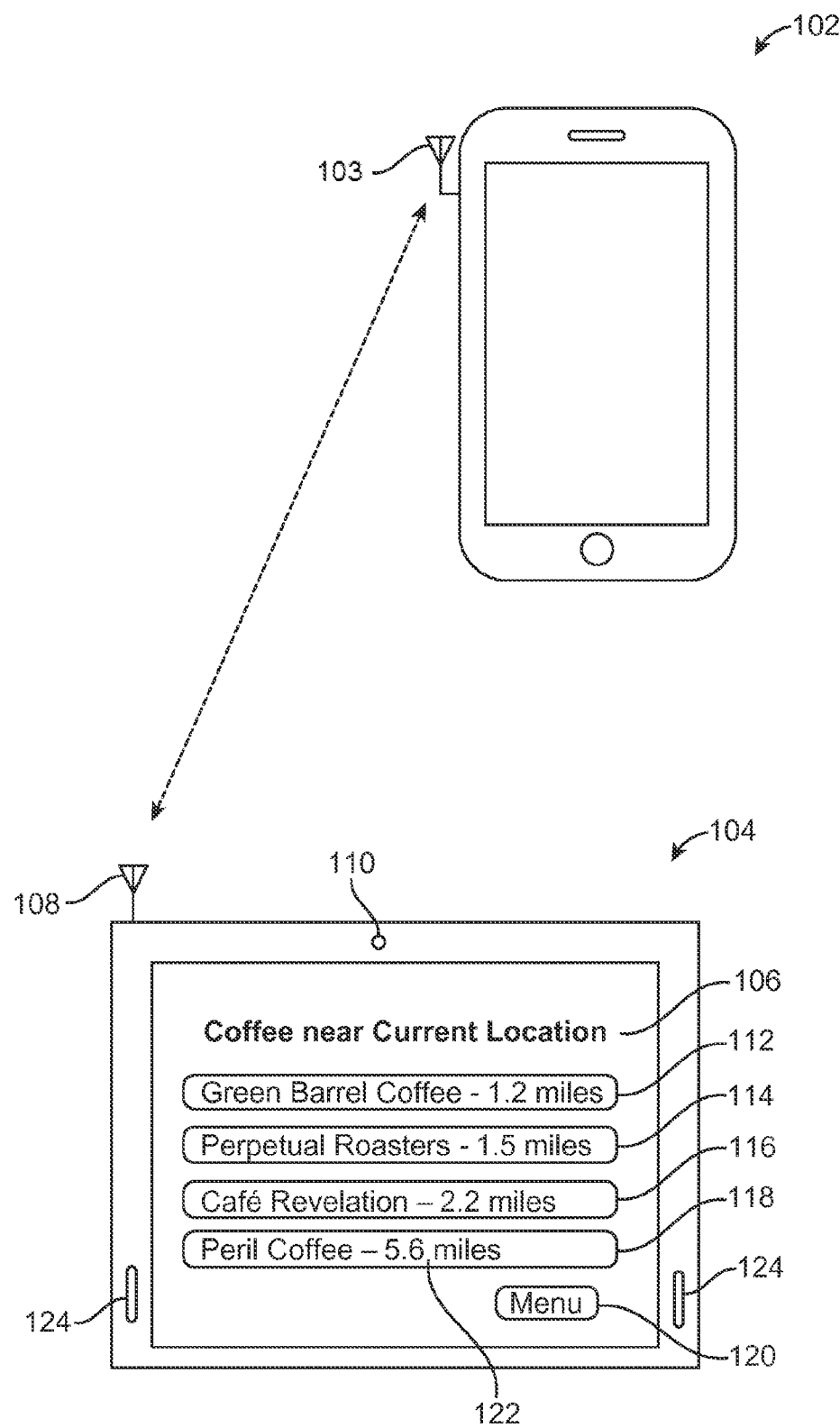
FIG. 1 illustrates a portable electronic device connected to an accessory according to an embodiment of the present invention.

Embodiments of the present invention relate to an accessory that presents information obtained from a portable electronic device. A user may desire to use an accessory to obtain information from the portable electronic device because the accessory provides an interface that is suitable to a user's current environment. In an illustrative example, a user is a driver of a vehicle and an accessory is a head unit of the vehicle. When the accessory is communicatively coupled to a portable electronic device, the user may use the accessory to issue requests to the portable electronic device.

A request may be received at an accessory via a user input device of the accesory user interface. For example, a user may issue a voice request which can be detected by a microphone of the accessory. The accessory can transmit information associated with the request to a portable electronic device. An application running on the portable electronic device, such as an automated assistant application, can provide a report including one or more results associated with the request. The report may have an associated intent (e.g., navigate to location, place telephone call, schedule event in calendar, send e-mail, send text message, check stock value, etc.). The results can be transmitted from the portable electronic device to the accessory. The accessory can present the results to the user (e.g., the results may be displayed on a display of the accessory).

The term "request" is used herein to indicate any user input that is intended for processing by the automated assistant. A request may include direct instructions (e.g., "search for cafés near here," "wake me up at 7:00 AM," "read my new messages," etc.) and queries (e.g., "who won today's Giants game?", "what time is the sunset today?", "what is the square root of negative one?", etc.) that an automated assistant can interpret to determine tasks to perform.

In an illustrative example, in response to a request to "call Peter," the intelligent automated assistant may locate several contacts with the name "Peter" stored in the portable electronic device. The portable electronic device may transmit a report generated by the intelligent automated assistant to the accessory. The report can include multiple results, such as the first and last name of each each contact named "Peter." The accessory may present the list of results on a display of the accessory. Because the voice request included the word "call," the automated assistant may associate the intent indicating "place a telephone call" with the report. An intent may be associated with each result of the report.

In accordance with an embodiment of the invention, a user may select a result from a list of results presented by the accessory. A function indicated by an intent associated with the selected result may be performed by the accessory. The intent associated with the selected result may be determined based on an intent associated with a report. Alternatively, information associated with the selected result may be transmitted from the accessory to the portable electronic device. The portable electronic device may perform a function indicated by an intent associated with the selected result. For example, using an input device of the accessory, the user may select "Peter Smith" from a list of results including all contacts named "Peter." Information associated with the selected result "Peter Smith" may be transmitted from the accessory to the portable electronic device. The automated assistant may perform a function indicated by an intent associated with the result "Peter Smith" by placing a call to the telephone number stored in association with the contact "Peter Smith" on the portable electronic device.

A portable electronic device (also referred to as a "portable device") generally refers to a handheld device that is capable of storing and/or accessing information and providing services related to information. Examples of such services can include the storage of personal data such as calendar, contacts, and notes; Internet access; mobile telephony and videoconferencing; and the ability to selectively download and run various application programs. Portable electronic devices can include portable media devices (e.g., iPod®, iPhone®, or iPad®) capable of managing and/or playing back media assets such as audio, video, and still image files.

An intelligent automated assistant (also referred to as an "automated assistant") is an application implemented on a portable electronic device to facilitate user interaction with the device and to help the user more effectively engage with local and/or remote services provided by the device. The automated assistant can interpret requests expressed in natural language and determine an action to take or task to perform based on its interpretation, and perform the task or action. For example, the automated assistant may be capable of receiving a request, interpreting the request with a language interpreter to derive a representation of user intent, identifying a task associated with the derived user intent, calling a service for performing the identified task, and providing a report based on data received from the service. The intelligent automated assistant may further identify one or more of a domain (e.g., point of interest search, contacts, calendar, stock market information, etc.), a task (e.g., find a restaurant, call a contact, look up an appointment, show stock values, etc.) and a parameter for the task (e.g., point of interest located in a specified city, contact having a particular name, event within a specified time range, stocks user has selected) based on the representation of user intent. An example of an intelligent automated assistant is the Siri application available for iOS devices. It will be understood that any application capable of receiving a request, interpreting language used in the request to determine user intent, and performing a task associated with the user intent to determine a result can be used as an "automated assistant."

An accessory can be any device capable of communicating with a portable electronic device and having a user interface to receive user input and to provide results received from the portable electronic device to a user. Accessories can include an in-vehicle entertainment system or head unit, an in-vehicle navigation device or standalone navigation device, a refreshable braille display, a video display system, and so on.

The portable device and accessory are described further below with reference to FIGS. 1 and 2. The automated assistant is described further below with reference to FIG. 3.

FIG. 1 illustrates a portable electronic device 102 communicatively coupled to an accessory 104 according to an embodiment of the present invention. Communications between portable electronic device 102 and accessory can occur via a communication interface. For example, the portable device and the accessory can each include RF transceiver components coupled to an antenna to support wireless communications. In an illustrative embodiment, antenna 103 of portable device 102 transmits wireless communications to and receives wireless communications from antenna 108 of accessory 104.

Accessory 104 can have a user interface including one or more components for providing output to the user, such as display 106 and/or speakers 124. The user interface of accessory 104 can also include one or more components to receive user input. For example, accessory 104 may include a microphone 110 that is capable of receiving vocal input, such as voice requests. In some embodiments, display 106 may be a touchscreen display that allows the user to enter input by selecting touchscreen buttons such as buttons 112-120. It will be recognized that accessory 104 may receive user input through other input devices such as physical buttons, a keypad, or other user input devices.

In an illustrative example, a user is the driver of a vehicle and accessory 104 is a part of a head unit of the vehicle. The user can state a voice request, such as, "where can I get coffee near my current location?" Accessory 104 can receive the request via microphone 110 and transmit the request to portable device 102. An application running on portable device 102, such as an automated assistant, can interpret the request. The automated assistant may determine, based on an interpretation of the request, that the user is issuing a request to perform a search for a location. The automated assistant may further determine that the request constrains the search to locations that are commercial establishments with the type "café" and to locations that are close to the current location of the user (e.g., within a predetermined distance of the current location). The intelligent automated assistant can perform the task indicated by the request, for example, by performing a search for a café.

Portable device 102 may transmit to accessory 104 a report including one or more results located by the automated assistant in response to the received request. For example, portable device 102 may transmit café locations resulting from the search performed by the automated assistant. The results (e.g., café names) may be accompanied by one or more items of additional information (e.g., distance from current location). The automated assistant may additionally generate an indication of user intent associated with one or more results of the report. For example, the automated assistant may determine that a request including the verb "find" or "where?" may indicate a request for navigation to a location. Portable device 102 may transmit the intent "navigate to location" to accessory 104 in association with one or more results transmitted to the accessory.

Accessory 104 can present the results received from portable electronic device 102 to the user. For example, accessory 104 can display a list of results 112-118 on display 106 of the accessory. One or more listed results may be accompanied by additional information received from the portable electronic device 102. For example, the result "Peril Coffee" shown at 118 may also show additional information, such as information indicating a distance from a current location (e.g., "5.6 miles," as shown at 122). In some embodiments, accessory 104 can also display information associated with an intent pertaining to a result received from the portable electronic device (e.g., "shall I provide directions to [result]?").

A user may select one of the options presented by accessory 104. For example, a user may touch button 112 of touchscreen display 106 to select result 112. If a result is accompanied by an intent, the accessory may execute the intent. For example, if the result is accompanied by an intent indicating a "navigate to location" function, when result 118 is selected, the accessory may provide a map or turn-by-turn directions to assist the user in navigating to the selected location.

In some embodiments, the accessory may transmit information associated with the selected result to portable electronic device 102. The automated assistant of portable device 102 may perform a function indicated by an intent associated with the selected result. For example, in response to receiving a selected result having the associated intent "navigate to location," the automated assistant can perform the function indicated by the intent (e.g. by providing a map or directions to assist in navigation to the location indicated by the selected result). When the automated assistant has executed the intent, portable electronic device 102 can transmit the information generated by the automated assistant to accessory 104. Accessory 104 can provide to the user information generated by the automated assistant in response to the user selection of a result. For example, accessory 104 can display navigation information received from portable electronic device 102 on display 106.

Figure 2:
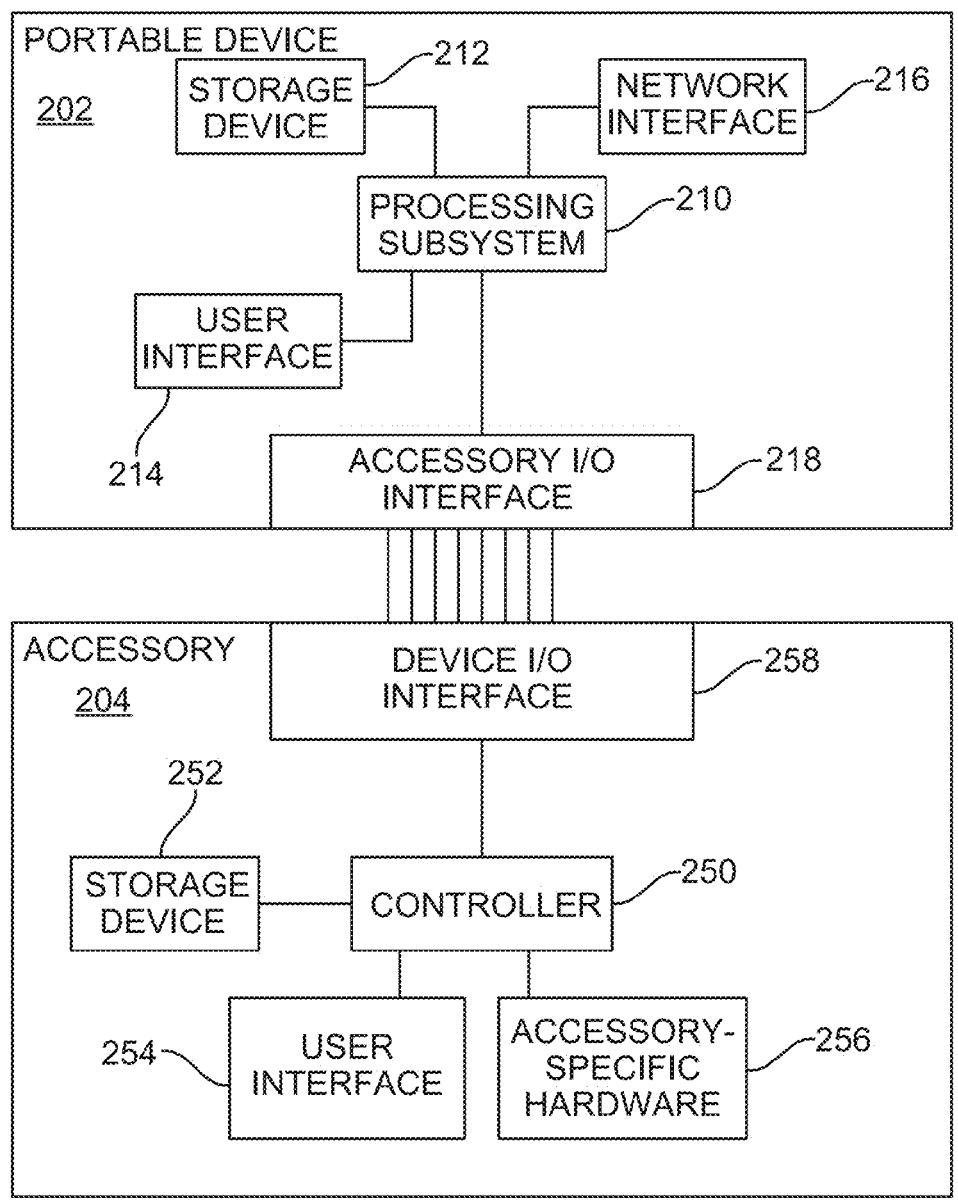
FIG. 2 is a block diagram of a system including a portable electronic device and an accessory according to an embodiment of the present invention.

FIG. 2 is a simplified block diagram of a system 200, which can be, e.g., an implementation of the devices shown in FIG. 1. System 200 includes a portable device 202 and accessory 204 according to an embodiment of the present invention. In this embodiment, portable device 202 (e.g., implementing portable electronic device 102 of FIG. 1) can provide computing, communication and/or media playback capability. Portable device 202 can include processing subsystem 210, storage device 212, user interface 214, network interface 216, and accessory input/output (I/O) interface 218. Portable device 202 can also include other components (not explicitly shown) such as a battery, power controllers, and other components operable to provide various enhanced capabilities.

Storage device 212 can be implemented, e.g., using disk, flash memory, or any other non-transitory storage medium, or a combination of media, and can include volatile and/or non-volatile media. In some embodiments, storage device 212 can store data objects such as audio files, video files, image or artwork files, information about a user's contacts (names, addresses, phone numbers, etc.), information about a user's scheduled appointments and events, notes, and/or other types of information. In some embodiments, storage device 212 can also store one or more application programs to be executed by processing subsystem 210 (e.g., an automated assistant, video game programs, personal information management programs, media playback programs, etc.).

User interface 214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 214 to invoke the functionality of portable device 202 and can view and/or hear output from portable device 202 via output devices of user interface 214.

Processing subsystem 210 can be implemented as one or more integrated circuits, e.g., one or more single-core or multi-core microprocessors or microcontrollers, examples of which are known in the art. In operation, processing system 210 can control the operation of portable device 202. In various embodiments, processing subsystem 210 can execute a variety of programs in response to program code and can maintain multiple concurrently executing programs or processes. At any given time, some or all of the program code to be executed can be resident in processing subsystem 210 and/or in storage media such as storage device 212.

Through suitable programming, processing subsystem 210 can provide various functionality for portable device 202. For example, in response to receiving a request from accessory 204, processing subsystem 210 can execute an automated assistant application to interpret the request, perform a task indicated by the request, and transmit a report responsive to the request to accessory 204. Processing subsystem 210 can also execute other programs to control other functions of portable device 202, including application programs that may be stored in storage device 212.

Network interface 216 can provide voice and/or data communication capability for portable device 202. In some embodiments network interface 216 can include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), components for short-range wireless networking (e.g., using Bluetooth standards), GPS receiver components, and/or other components. In some embodiments, network interface 216 can provide wired network connectivity (e.g., Ethernet) in addition to or instead of a wireless interface. Network interface 216 can be implemented using a combination of hardware (e.g., driver circuits, antennas, modulators/demodulators, encoders/decoders, and other analog and/or digital signal processing circuits) and software components.

In some embodiments, accessory I/O interface 218 can allow portable device 202 to communicate with various accessories. For example, accessory I/O interface 218 can support connections to an in-vehicle entertainment system or head unit, an in-vehicle navigation or standalone navigation device, a refreshable braille display, a video display system, and so on. Accessory I/O interface 218 can support wireless communication (e.g., via WiFi, Bluetooth, or other wireless protocols). In some embodiments, accessory I/O interface 218 can include a connector in addition to or instead of wireless communication channels. For example, accessory I.O. interface 218 can include connectors corresponding to the connectors used in various iPod®, iPhone®, and iPad® products, as well as supporting circuitry. The connector can provide connections for power and ground as well as for one or more data communication interfaces such as Universal Serial Bus (USB), FireWire (IEEE 1394 standard), and/or universal asynchronous receiver/transmitter (UART). In some embodiments, the connector provides dedicated power and ground contacts, as well as some number (e.g., four) of programmable digital data contacts that can be used to implement different communication technologies in parallel; for instance, two pins can be assigned as USB data pins (D+ and D−) and two other pins can be assigned as serial transmit/receive pins (e.g., implementing a UART interface); the assignment of pins to particular communication technologies can be negotiated while the connection is being established. In some embodiments, accessory I/O interface 218 can provide connections for audio and/or video signals, which may be transmitted to or from portable device 202 in analog and/or digital formats. Thus, accessory I/O interface 218 can support multiple communication channels, and a given accessory can use any or all of these channels.

Accessory 204 (e.g., implementing accessory 104 of FIG. 1) can include controller 250, storage device 252, user interface device 254, other accessory-specific hardware 256, and device I/O interface 258. Accessory 204 is representative of a broad class of accessories that can interoperate with a portable electronic device, and such accessories can vary widely in capability, complexity, and form factor. Various accessories may include components not explicitly shown in FIG. 2, including but not limited to speakers, ports for connecting to external audio/video devices, and so on. In addition, some accessories may provide an additional interface (not shown) that can connect to and communicate with another accessory.

Controller 250 can include, e.g., one or more single-core or microprocessors and/or microcontrollers executing program code to perform various functions associated with accessory 204. For example, when a user provides a request to user interface 254 of accessory 204, controller 250 can determine that a request was received and responsively invoke functionality of accessory 204; in some instances, the invoked functionality can include sending information associated with the request to and/or receiving results associated with the request from portable device 202.

Storage device 252 can be implemented, e.g., using disk, flash memory, or any other non-transitory storage medium, or a combination of media, and can include volatile and/or non-volatile media. In some embodiments, storage device 252 can store data objects and/or one or more application programs to be executed by controller 250. For example, if accessory 204 is a navigation device, storage device may store map data, information associated with points of interest, and one or more applications associated with providing navigation information via a user interface of the device.

User interface 254 may include user-operable input devices such as a touch pad, touch screen, scroll wheel, click wheel, dial, button, switch, keypad, microphone, or the like, as well as output devices such as a video screen display, indicator lights, speakers, headphone jacks, or the like, together with supporting electronics (e.g., digital-to-analog or analog-to-digital converters, signal processors, or the like). A user can operate input devices of user interface 254 to invoke functionality of portable device 202.

Accessory-specific hardware 256 can include any other components that may be present in accessory 204 to enable its functionality. For example, in various embodiments accessory-specific hardware 234 can include a GPS receiver; a network interface; power supply and/or power management circuitry; environmental sensors (e.g., temperature sensor, pressure sensor, accelerometer, chemical sensor, etc.); and so on. It is to be understood that any type of accessory functionality can be supported by providing appropriate accessory-specific hardware 256.

Device I/O interface 258 can allow accessory 204 to communicate with portable device 202. In accordance with some embodiments of the invention, device I/O interface 258 can support wireless communication (e.g., via WiFi, Bluetooth, or other wireless protocols). Device I/O interface 258 can be used to send and/or receive audio and/or video signals in analog and/or digital formats. Information associated with audio signals and other information can be transmitted from accessory 204 to portable device 202 via device I/O interface 258. In other embodiments, device I/O interface include a connector that mates directly with a connector included in portable device 202 in addition to or instead of wireless communication channels. Such a connector can include a connector complementary to the connectors used in various iPod®, iPhone®, and iPad® products. A connector can be used to supply power to portable device 202 and/or receive power from portable device 202, to send and receive signals, and to communicate information using one or more data communication interfaces such as USB, UART, and/or FireWire. Other connectors may also be used; for example, device I/O interface 258 can incorporate a standard USB connector and can connect to accessory I/O interface 218 of portable device 202 via an adapter cable.

Accessory 204 can be any electronic apparatus that interacts with portable device 202. In some embodiments, accessory 204 can provide remote control over operations of portable device 202, or a remote user interface that can include both input and output controls (e.g., a display screen to display current status information obtained from portable device 202). Accessory 204 in various embodiments can control any function of portable device 202. For example, a request received at accessory 204 can cause portable device 202 to initiate a phone call to a contact, perform a search, etc. In other embodiments, portable device 202 can control operations of accessory 204, such as retrieving stored data from storage device 252 of accessory 204, directing accessory 204 to execute an application for navigation to a location, etc.

It will be appreciated that the system configurations and components described herein are illustrative and that variations and modifications are possible. The portable device and/or accessory may have other capabilities not specifically described herein (e.g., mobile phone, global positioning system (GPS), broadband data communication, Internet connectivity, etc.).

Connectors at the respective I/O interfaces 218, 258 of portable device 202 and accessory 204 can be complementary or not as desired. Where two connectors are not complementary, an adapter (not shown) can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the portable device and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 218 of portable device 202 and device I/O interface 258 of accessory 204 allow portable device 202 to be connected with accessory 204 and subsequently disconnected from accessory 204. As used herein, a portable device and an accessory are "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Bluetooth.

In some embodiments, a portable device and an accessory can communicate while connected by exchanging messages and data according to an "accessory protocol." The messages and data can be communicated, e.g., using any wired or wireless transport medium provided by the relevant interfaces.

The accessory protocol can define a "universe" of messages that can be exchanged between portable device 202 and any accessories connected thereto, such as accessory 204. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated, as described below), while the payload provides all or part of the message data. The packet can also include error detection or error correction codes as known in the art.

In some embodiments, the messages can be logically grouped into a "general" message set and an "optional" message set. Every accessory and every portable device that use the accessory protocol can be required to support at least the general message set. This message set can include messages enabling the portable device and the accessory to identify and authenticate themselves to each other and to provide information about their respective capabilities, including which (if any) of the messages in the optional set each supports. For example, the general message set can include a message the accessory can send to the portable device to list every message in the optional set that the accessory is capable of sending and every message in the optional set that the accessory is capable of receiving and acting on. The general message set can also include authentication messages that the portable device can use to verify the purported identity and capabilities of the accessory (or vice versa), and the accessory (or portable device) may be blocked from invoking certain (or all) of the optional messages if the authentication is unsuccessful.

The optional message set can include messages related to various functionality that might or might not be supported in a given accessory. For example, the optional message set can include simple remote messages that allow an accessory to identify a function of the portable device to be invoked, remote user interface messages that can be used to obtain information related to replicating all or part of a user interface of a portable device on an accessory (thereby supporting a more advanced remote control), messages that include information associated with a request for an automated assistant, messages that allow a user to control a radio tuner in an accessory by operating a portable device and/or to control a radio tuner in a portable device by operating an accessory, and so on. Any combination of optional messages can be defined in an accessory protocol, and there is no requirement that a given accessory or portable device support all (or even any) of the optional messages.

Figure 3:
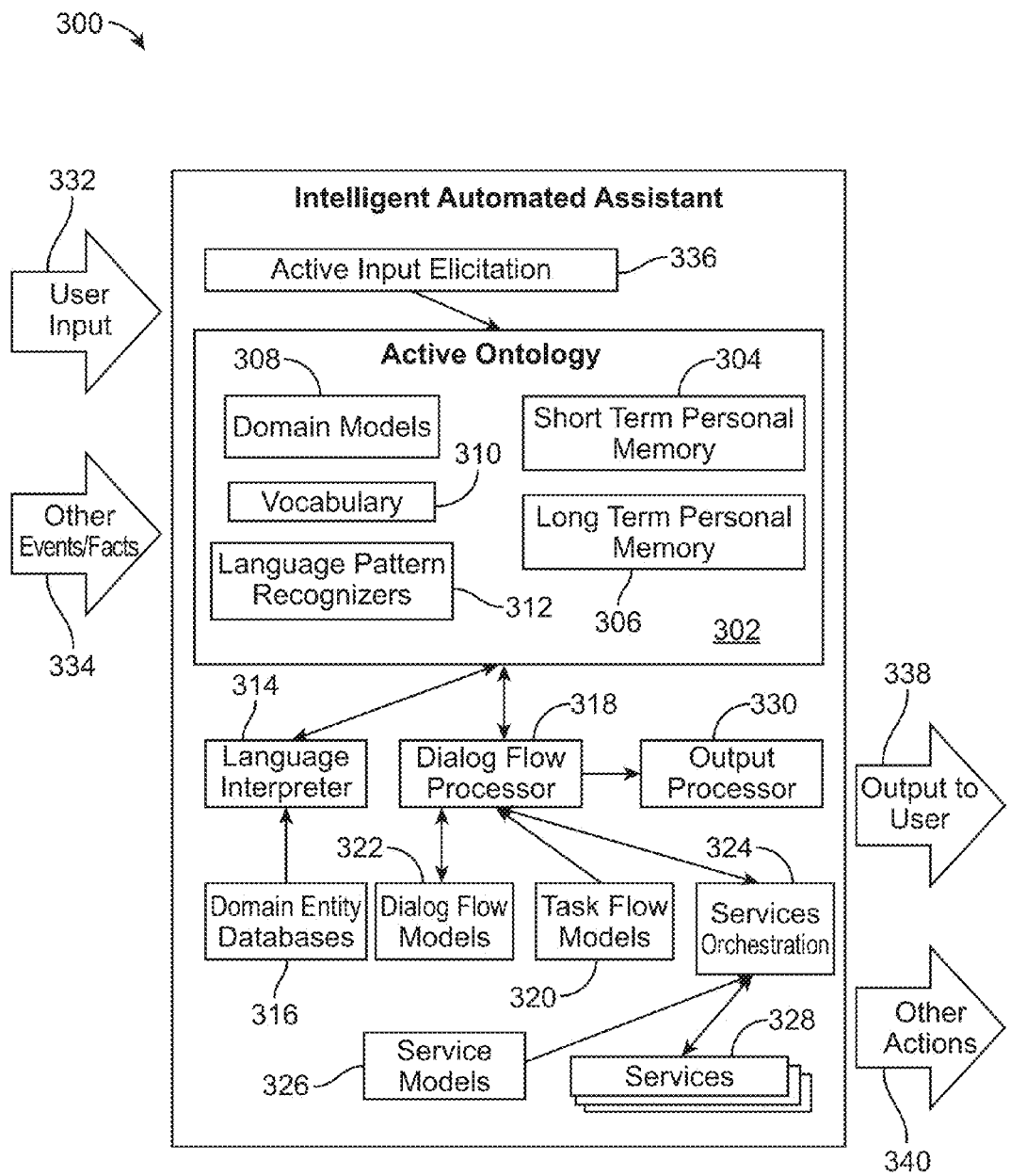
FIG. 3 is a block diagram of an automated assistant according to an embodiment of the present invention.

FIG. 3 is a block diagram depicting an example of an automated assistant application 300 that may be stored by storage device 212 of portable device 202 and executed by processing subsystem 210 of portable device 202. The automated assistant can be similar to an intelligent automated assistant referred to in U.S. patent application Ser. No. 12/987,982 filed Jan. 10, 2011. According to various embodiments, automated assistant 300 may include one or more of the following systems, components, device, processes, and the like (or combinations thereof): one or more active ontologies 302, active input elicitation component(s) 336, short term memory component(s) 304, long term memory component(s) 306, domain model component(s) 308, vocabulary component(s) 310, language pattern recognizer component(s) 312, language interpreter component(s) 314, domain entry database(s) 316, dialog flow processor component(s) 318, task flow models component(s) 320, dialog flow models component(s) 322, services orchestration component(s) 324, service models component(s) 326, services component(s) 328, and output processor component(s) 330.

Automated assistant 300 may receive a user input 332 (e.g., a request transmitted from accessory 204 to portable device 202). Automated assistant 300 may receive and/or retrieve additional information (i.e., other events/facts 334) associated with the request. For example, automated assistant 300 may receive location coordinates as determined by GPS receiver components of accessory 204. The location coordinates may be transmitted in a message sent from accessory 204 to portable device 202. In another example, automated assistant 300 may obtain location coordinates as determined by GPS receiver components of portable device 202.

In some embodiments, active input elicitation component(s) 336 may be operable to elicit, facilitate, and/or process input from the user or the user's environment. For example, active input elicitation 336 may retrieve information about a user's constraints or preferences as stored by automated assistant 300. Performing active input elicitation allows automated assistant 300 to disambiguate intent at an early phase of input processing.

Active ontologies 302 serve as a unifying infrastructure that integrates models, components, and or data from other parts of automated assistant 300. In the field of computer and information science, ontologies provide structures for data and knowledge representation such as classes/types, relations, attributes/properties, and their instantiation in instances. In some embodiments of automated assistant 300, ontologies are part of the modeling framework in which to build models such as domain models. Active ontologies 302 may also serve as an execution environment in which distinct processing elements carry out at least some of the tasks of automated assistant 300.

In some embodiments, various components are organized under a common container associated with active ontology 302. Short term memory component(s) 304 may be used to match any prior input or portion of prior input, and/or any other property or fact about the history of interaction with a user. For example, partial input may be matched against cities that the user has encountered in a current session. Long term memory component 306 may be used to suggest information that has been saved in storage device 212 of portable device 202, such as a name of a contact, a restaurant that the user has indicated as a "favorite," one or more stocks that a user has selected to follow on portable device 202, etc. Domain model component(s) 308 may constrain the inputs by suggesting concepts, relations, properties and/or instances that would be consistent with the current input. Vocabulary component(s) 310 may suggest words or phrases that match the current user input 332. Language pattern recognizer component(s) 312 may be used to recognized idioms, phrases, grammatical constructs, or other patterns in the current input and may be used to suggest completions that fill out the pattern.

In some embodiments, automated assistant 300 may obtain information that is stored remotely from portable device 202. For example, automated assistant 300 may obtain information from the Internet via network interface 216 of portable device 202. Further, automated assistant 300 may obtain information stored on storage device 252 of accessory 204. When automated assistant 300 is reliant on network interface 216 to generate a response to a request, automated assistant 300 may provide status information including a "no network access" status or the like, indicating that automated assistant 300 is not able to respond to requests requiring network access.

A request received by automated assistant 300 may be parsed and analyzed by language interpreter component(s) 314. Language interpreter 314 may determine whether a request contains a match for an entry in domain entity database 316. Domain entity database 316 may also be used to suggest to a user possible entities in the domain that match the input (e.g., business names, movie names, event names, etc.). Dialog flow processor component(s) 318 may identify the task a user wants performed and/or a problem the user wants solved and identify parameters to the task or problem. For example, from the request "where can I get coffee near my current location?" dialog flow processor 318 may determine that the task a user wants performed is to search for a business. Dialog flow processor 318 may also determine parameters for the task, such as a type of business to find (e.g., a café) and a location constraint (e.g., within a particular city, within a particular zip code, within a predefined radius from the current user location, etc.).

Dialog flow processor 318 may access and/or utilize information from one or more associated databases, such as task flow models 320 and dialog flow models 322. Task flow model component(s) 320 can store representations of the steps one takes to solve a problem or address a need. For example, the task flow for the generic task of responding to a request "where can I get coffee near my current location?" can include steps for performing a search for a business having a particular type, providing one or more results accompanied by information such as distance from a current location, receiving a selection of a location result, and providing navigation data to help the user navigate to the selected location. Dialog flow model component(s) 322 can store representations of the steps one takes in a particular kind of conversation between a user and an automated assistant. For example, the automated assistant may confirm the search parameters before performing the search or ask if the user would like for navigation instructions to be provided.

Services orchestration 324 may dynamically and automatically determine information related to services used to obtain information. For example, services orchestration component(s) 324 may determine what services can be requested in accordance with domains and tasks associated with a request, call one or more services, transform task parameters and constraints to meet input requirements of service application programming interfaces (APIs), monitor and gather results from one or more services, merge service results from multiple services, orchestrate a plurality of services to meet the parameters for a request, etc. In an illustrative example, to find and reserve a table at a restaurant, services orchestration component(s) 324 may make determinations as to which services to call in order to perform functions such as looking up restaurant reviews, determining availability at a restaurant, and making a reservation at a restaurant. Service model component(s) 326 may be used by services orchestration 234 to provide machine readable information about services 328, such as capabilities of services to perform certain classes of computation, capabilities of services to answer certain classes of queries, information about which classes of transactions are provided by various services, information about parameters of APIs exposed by various services, information about parameters that may be used in database queries on databases provided by various services, etc.

Output processor component(s) 330 may format output data that is represented in a uniform internal data structure into a form that renders it appropriately on different modalities. For example, output processor 330 can format output data according to a structured data format recognizable to accessory 204. The structured data format may be the vCard format, a file format that has defined property types to contain information such as names, addresses, phone numbers, e-mail addresses, uniform resource locators (URLs), images, audio files, geographical location coordinates, etc. The structured data format may be defined in extensible markup language (XML).

Output data 338 may be a report including one or more results determined by automated assistant 300 based on an interpretation of a received request. The report may include additional information associated with the results and and/or an intent associated with the results. Output data 338 can be transmitted from portable device 202 to accessory 204. In some embodiments, automated assistant 300 can perform additional actions 340 after providing a response to a request. For example, if a user selects a result, information associated with the selected result may be received by automated assistant 300. Automated assistant 300 can perform a function indicated by an intent associated with a result (e.g., call a selected contact, provide navigation instructions to a selected location, etc.).

Components referenced in FIG. 3 can be implemented on portable device 204 or on a remote server. For example, interpretation of a request may occur on portable device 204 and text associated with the request may be transmitted to a remote server for further processing. The remote server may perform a task indicated by the request and provide results to portable device 204.

FIG. 4A is a table listing messages that can be sent from an accessory to a portable device, according to an embodiment of the present invention. FIG. 4B is a table listing messages that can be sent from a portable device to an accessory, according to an embodiment of the present invention. The accessory and portable device of FIGS. 4A and 4B can be, e.g., accessory 204 and portable device 202, respectively, as described with reference to FIG. 2. Each of the communications described with reference to FIGS. 4A and 4B can be messages included in the optional message set of an accessory protocol as described above.

At any time a communication connection is established between portable device 202 and accessory 204, accessory 204 can send an ActivateAutoAsst message, as indicated in FIG. 4A, to activate an automated assistant application (e.g., automated assistant 300 described with reference to FIG. 3) executable by portable device 202. For example, in response to operation of a particular user input device, such as a push-to-talk button located within a vehicle (e.g., on a steering wheel of the vehicle) an ActivateAutoAsst message may be generated by accessory 204 to activate automated assistant 300. In some embodiments, an ActivateAutoAsst message initiates routing of user input received at the user interface of accessory 204 to portable device 202. For example, audio associated with voice requests received at a microphone of accessory 204 may be routed to portable device 202. User input routing can be controlled by accessory 404, e.g., based on whether an ActivateAutoAsst message has been sent.

In some embodiments, when automated assistant 300 is activated by accessory 204, portable device 202 transmits a graphical user interface for automated assistant 300 to accessory 204 using a SendGUI message, as indicated in FIG. 4B. Accessory 204 can display the received graphical user interface and receive input directed to automated assistant 300 via the received graphical user interface.

Accessory 204 may request an automated assistant status from portable device 202 using a GetAutoAsstState message, as indicated in FIG. 4A. Portable device 202 may send automated assistant status message SendAutoAsstState indicating a state of the automated assistant to accessory 204, as indicated in FIG. 4B. Exemplary SendAutoAsstState messages can include automated assistant status information indicating that automated assistant 300 is activated, deactivated, available, or unavailable. If automated assistant 300 does not have access to a network used by the automated assistant, portable device 202 can send a SendAutoAsstState message to accessory 204, e.g., indicating that the automated assistant service is unavailable or limited. Accessory 204 may present information received via the SendAutoAsstState message with a notification to a user via user interface (e.g., a display) of the accessory.

Accessory 204 may send accessory status notifications to portable device 202 using a SendAccMode message, as indicated in FIG. 4A. For example, accessory 204 may indicate a mode of the accessory (or a change in a mode of the accessory) to portable device 202. In some embodiments, SendAccMode message may indicate that the accessory is entering a hands-free (voice request input) mode, entering an eyes-free (synthesized speech output) mode, exiting a hands-free mode, or exiting an eyes-free mode. SendAccMode may be a message indicating that the accessory will receive input from a user and/or provide output to a user in accordance with a particular mode such as a hands-free or eyes-free mode. Automated assistant 300 may change the way in which received data is handled in response to a SendAccMode message. Automated assistant may further change the way in which portable device 202 provides data to accessory 204 in response to a received SendAccMode message. In some embodiments, a SendAccMode message includes one or more bits indicating that the automated assistant 300 is to change the way in which received data is handled in response to SendAccMode message. SendAccMode may further include one or more bits indicating that the automated assistant 300 is to change the way in which portable device 202 provides data to accessory 204 in response to SendAccMode message. In some embodiments, portable device 202 can request an accessory mode status by sending a GetAccMode message to accessory 204, as indicated in FIG. 4B.

A request received at a user interface of accessory 204 or a representation of the request may be transmitted to portable device 202 using a SendRequest message, as indicated in FIG. 4A The SendRequest message may include analog audio, digital audio, text converted from speech, text entered at a user interface of accessory 204, etc., depending on the accessory type and user input type. For example, voice request received at a microphone of accessory 204 may be routed to portable device 202. Alternatively, a digital representation of the voice input can be sent from accessory 204 to portable device 202. In some embodiments, a SendRequest message may include information associated with a voice request. For example, accessory 204 may convert part or all of a voice request to text and transmit text associated with the voice request to portable device 202. In some embodiments, a request may be received at accessory 404 as text input (e.g., via a touchscreen input device, keyboard input device, etc.) and a SendRequest message may include the text input.

After receiving a SendRequest message, portable device 202 may send SendAutoAsstState message to accessory 204 regarding the progress of automated assistant 300 in providing a response to a request included in a SendRequest message. For example, a SendAutoAsstState message can be provided to accessory 204 indicating that a request has been received, that a request is being processed, that additional information is needed to process a request, etc. Additionally, portable device 202 may send a SendAutoAsstState message to accessory 204 indicating that automated assistant 300 is unable to determine a task associated with the request. If automated assistant 300 performs a task associated with a request but is unable to locate any results, portable device 202 may send a SendAutoAsstState and/or SendReport message to accessory 204 indicating that no results were found.

When automated assistant 300 completes a task in response to a received SendRequest message, portable device 202 may transmit to accessory 204 a SendReport message including a report that automated assistant 300 has generated based on the request. A report sent in a SendReport message may include one or more results. In some embodiments, a user may select a result from a report. A SelectResult message indicating a user selection of a result may be transmitted from accessory 204 to portable device 202. Automated assistant 300 may receive the user selection and perform a function associated with the user selection.

When eyes-free mode is activated, portable device 202 may transmit audio data to accessory 204. For example, if a report includes multiple results, a SelectResult message can include an audio file of synthesized speech corresponding to each result of the list of results. The list or results can be "spoken" aloud to the user as accessory 204 reproduces the audio received from portable device 202.

A SendResultResponse message indicating information and/or a status associated with the selected result may be sent from portable device 202 to accessory 204. For example, if a user has selected a contact name from a list of contact results in a report, the user selection is sent to portable device 202 in a SelectResult message. Automated assistant 300 may perform a function associated with the user selection, such as calling the selected contact. Portable device 402 may send a SendAutoAsstState message indicating that automated assistant 300 is placing a call to the selected contact.

In some embodiments, accessory 204 can send a DeactivateAutoAsst message to portable device 202 to deactivate an automated assistant application.

The communications described with reference to the sequence diagram of FIG. 4 may be implemented in a process such as the process described with reference to FIG. 5.

Figure 5:
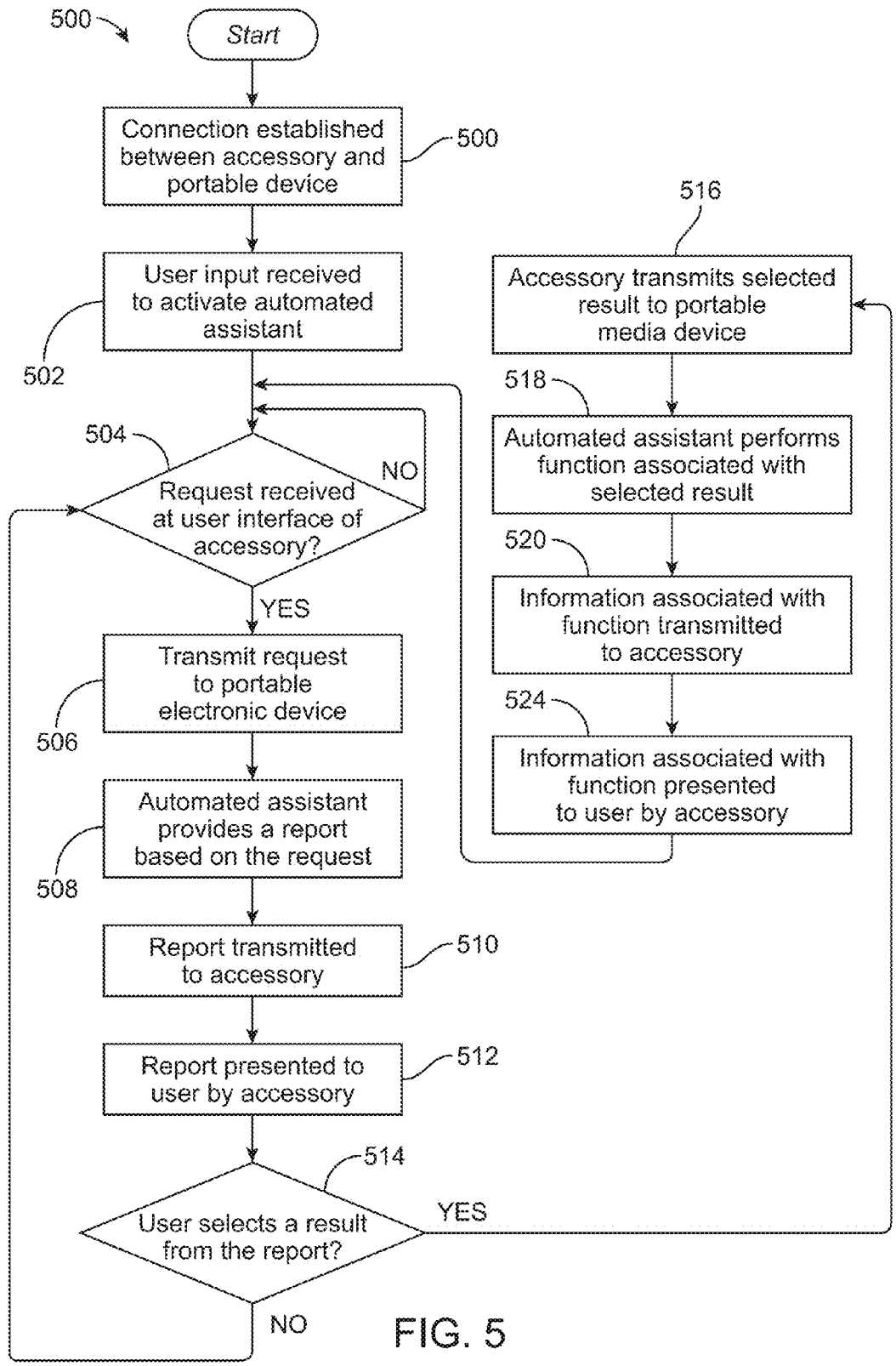
FIG. 5 is a flow diagram of a process for using an accessory to communicate with an automated assistant of a portable electronic device, according to an embodiment of the present invention.

FIG. 5 is a flow diagram of a process for using an accessory to communicate with an automated assistant of a portable device. At block 500, a connection is established between an accessory and a portable device (e.g., accessory 204 and portable device 202 described with reference to FIG. 2). For example, accessory 204 may detect a signal transmitted by portable device 202 indicating a request to initiate a wireless connection. A wireless connection may be established between accessory 204 and portable device 202 automatically according to one or more routines implemented by accessory 204, or in response to a user input selecting an option to establish a connection. In another example, accessory 204 may transmit a signal to advertise its presence and a wireless connection may be established automatically or by selection of accessory 204 by a user interface of portable device 202. In some embodiments, a connection is established when mating connectors of accessory 204 and portable device 202 are physically connected.

At block 502, accessory 204 can receive user input to activate automated assistant 300. For example, accessory 204 may receive input such as a voice request, operation of a button, etc. at an input device of user interface 254 indicating that automated assistant 300 is to be activated. In this manner, accessory 204 is notified that subsequent requests are to be directed to automated assistant 300. Alternatively, a request received at user interface can include a cue indicating that the request is to be directed to automated assistant 300. For example, the request may be prefaced with an identifier of the automated assistant (e.g., "Siri, how far is it from the Earth to the Sun?").

At block 504, accessory 204 can determine whether a request has been received at user interface 254 of the accessory. In an illustrative example, accessory 204 may initiate a subroutine to detect a request in response to establishing a connection with portable device 202. In another example, portable device 202 may send a message to accessory 202 directing accessory 202 to detect a request. In some embodiments, prior to providing a request to accessory 204, a user indicates that a request will be provided by providing input at user interface 254 (e.g., by operating a button of user interface 254).

If a request is detected, accessory 204 can transmit the request (e.g., request 412 described with reference to FIG. 4) to portable device 202, as indicated at block 506. At block 508, an automated assistant (e.g., automated assistant 300 described with reference to FIG. 3) executed by portable device 202 can provide a report based on the request. For example, the automated assistant can interpret the request, perform a task associated with the request, and provide a report including one or more results obtained by performing the task.

At block 510, report 418 can be transmitted from portable device 202 to accessory 204. One or more results of the report may be provided in a structured data format such as a vCard. A result may have an associated intent that can indicate a function to be performed in association with the result. One or more items of additional information may be associated with a result.

At block 512, accessory 204 can present the report to a user via user interface 254. For example, one or more results of the report may be displayed on a display of accessory 204. In some embodiments, accessory 204 may convert text of the results to a verbal audio output (e.g., synthesized speech) and present the verbal audio output to the user via a speaker of accessory 204. For example, accessory 204 may present results to a user as synthesized speech when accessory 204 is operating in an "eyes free" mode. In another example, automated assistant 300 may generate the results as synthesized speech and report 418 may be provided to the accessory as a digital or analog audio file containing the synthesized speech.

At block 514, accessory 204 determines whether a selection of a result has been received at a user input device of user interface 254. If a user selects a result from report 418, accesory 204 can transmit the selected result to portable media device 202, as indicated at block 516. At block 518, automated assistant 300 can perform a function associated with the selected result. The function performed by automated assistant 300 may be based on an intent associated with the result. For example, if the selected result is a contact, and an intent associated with the selected contact is "place telephone call," automated assistant 300 can perform a function to place a telephone call to the selected contact. Information associated with the performed function may be transmitted to acessory 204, as indicated at block 520. For example, status information (e.g., "call in progress") or other information (e.g., navigation information associated with a selected location) may be transmitted to accessory 204. As indicated at block 524, accessory 204 may present the information associated with the performed function via an output device (e.g., display) of user interface 254.

Figure 6A:
FIGS. 6A-6C are screenshots of a display of an accessory showing status messages received from an automated assistant, according to an embodiment of the present invention.
Figure 6B:
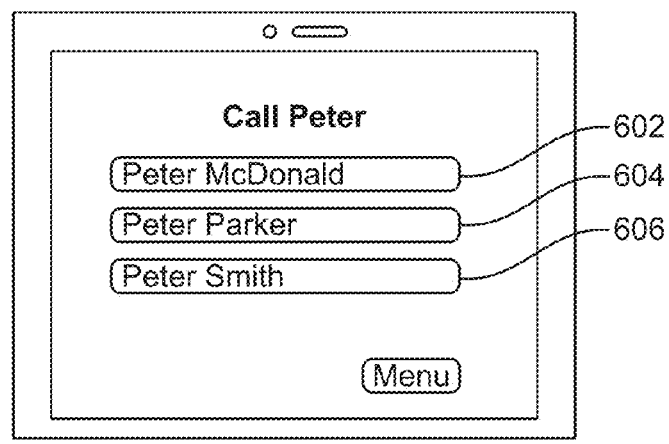
Figure 6C:
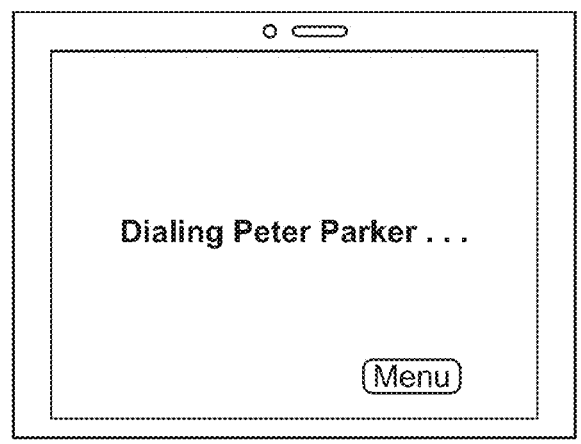

FIGS. 6A-6C are exemplary screen shots of a display of accessory 204 displaying information received from portable device 202. In FIG. 6A, accessory 204 displays the status message "Ready to Receive Request." This may indicate that one or more of the following is true: a communication connection has been established between portable device 202 and accessory 204, automated assistant 300 has been activated by accessory 204 (e.g., via an ActivateAutoAsst message as described with reference to FIG. 4A), and automated assistant 300 has network access (as indicated by portable device 202, e.g., via an SendAutoAsstState message as described with reference to FIG. 4B).

In FIG. 6B, accessory 204 displays results 602-606. This may indicate that accessory 204 has received a request input and transmitted the request to portable device 202 (e.g., via a SendRequest message). In the example, automated assistant 300 has interpreted the request and determined that the task involves locating contacts named Peter. Automated assistant 300 has performed the task by searching the contacts stored on portable electronic device 202 matching the parameter "contacts named Peter" and has located three results in the stored contacts that satisfy the task criteria. Portable device 202 has transmitted a response (e.g., a SendReport message) to accessory 204 including results 602-606.

In FIG. 6C, accessory 204 displays the status "Dialing Peter Parker." This may indicate that accessory 204 has received a user selection of result 604 and transmitted the user selection (e.g., via a SelectResult message) to portable device 202. Automated assistant 300 has performed the function indicated by the intent "place a call" associated with result 604. Portable device 202 has sent a message (e.g., SendAutoAsstState) to accessory 204 indicating information associated with the function performed by automated assistant 300. In another illustrative example, accessory 204 can place a call using its own telephone connection, or may invoke a telephone function of portable device 204 without using automated assistant 300.

In some embodiments, accessory 204 may perform one or more functions related to results generated by automated assistant 300 and received from portable device 402. For example, accessory 204 could store a log of results generated by automated assistant 300.

Accessory 204 may also send information other than user input to automated assistant 300. For example, accessory 204 may send location information to automated assistant 300 on a periodic basis or in response to a request or parameters defined by a user. Automated assistant 300 may keep a log of such information received from accessory 204. Non-request information received by automated assistant 300 may be used to provide information to other users via a network. For example, a user may issue a request to automated assistant 300 to locate one or more people for whom location information is being tracked. Automated assistant 300 may access location information stored by automated assistant applications running on portable electronic devices belonging to others. Alternatively, automated assistant 300 may access location information stored in a repository of location information accessible to automated assistant 300.

A user may wish to share and/or store a location, point of interest, or other information available from accessory 204 using automated assistant 300. A request received at accessory 204 may direct automated assistant 300 to obtain information from accessory 204 to share (e.g., by posting an update to a social network) and/or to store to storage device 212 of portable device 202.

Embodiments described herein relate to an accessory configured to receive a request and transmit information associated with the request to a portable device. An automated assistant of the portable device can interpret the request and perform a task associated with the request. The portable device can provide a report to the accessory including one or more results determined by the automated assistant as a result of performing the task.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method for communicating with an automated assistant executing on a portable electronic device using an accessory, the method comprising:
establishing a communication channel between the accessory and the portable electronic device, wherein the accessory is configured to remotely control operations of the portable electronic device via the automated assistant,
wherein the portable electronic device and the accessory communicate through messages which are grouped into a general message set and an optional message set, wherein the general message set includes authentication messages to verify an identity and a capability of the portable electronic device or the accessory, and the optional message set comprising functionality information of the portable electronic device or the accessory, and wherein the portable electronic device or the accessory may be blocked from evoking certain or all of the optional messages if the authentication is unsuccessful;
wherein the automated assistant is an intelligent application facilitating interaction with the portable electronic device;
transmitting, by the accessory, to the portable electronic device, an indication of a mode of the accessory;

receiving, by the accessory, input to activate the automated assistant executing on the portable electronic device;

receiving, by the accessory, a voice request;

transmitting, by the accessory, data associated with the voice request to the automated assistant executing on the portable electronic device;

receiving, by the accessory, a report responsive to the voice request from the portable electronic device, wherein the report is generated by the automated assistant, wherein the report is received in accordance with the mode indicated by the accessory and the report includes one or more search results obtained by the automated assistant based on the voice request;

presenting, by the accessory, the report in accordance with the mode indicated by the accessory;

receiving, by a user input device of the accessory, a selection of a result associated with the report; and transmitting, by the accessory, the selected result to the automated assistant executing on the portable electronic device.

2. The method of claim 1, wherein the report includes one or more results, each result formatted as a vCard.

3. The method of claim 1, wherein the report includes an associated intent.

4. The method of claim 1, further comprising, by the accessory, performing a function indicated by an intent associated with the selected result.

5. The method of claim 1, wherein the portable electronic device is configured to perform a function indicated by an intent associated with the selected result.

6. The method of claim 1, further comprising:
receiving a status message from the portable electronic device; and
displaying the status message on a display of the accessory.

7. The method of claim 1, wherein presenting the report comprises displaying the report on a display of the accessory.

8. The method of claim 1, wherein presenting the report comprises producing a verbal audio output.

9. The method of claim 1, wherein the accessory is a head unit of a vehicle.

10. A method for communicating with an accessory, comprising, by a portable electronic device:
establishing a communication channel between the accessory and the portable electronic device, wherein the accessory is configured to remotely control operations of the portable electronic device via an automated assistant executing on the portable electronic device,
wherein the portable electronic device and the accessory communicate through messages which are grouped into a general message set and an optional message set, wherein the general message set includes authentication messages to verify an identity and a capability of the portable electronic device or the accessory, and the optional message set comprising functionality information of the portable electronic device or the accessory, and wherein the portable electronic device or the accessory may be blocked from evoking certain or all of the optional messages if the authentication is unsuccessful;
wherein the automated assistant is an intelligent application facilitating interaction with the portable electronic device;
receiving, from the accessory, a message indicating a mode of the accessory;
receiving, from the accessory, data associated with a voice request received by the accessory;
determining, by the automated assistant of the portable electronic device, a task associated with the request;
performing, by the automated assistant, the task;
generating, by the automated assistant, a report including one or more results determined by performing the task, wherein the report is generated in accordance with the received mode of the accessory and the report includes one or more search results obtained by the automated assistant based on the voice request;
sending the report to the accessory; and
receiving, from the accessory, a selection of a result associated with the report.

11. The method of claim 10, further comprising sending a status message to the accessory, wherein the status message indicates a state of the automated assistant.

12. The method of claim 10, wherein each result of the report has an associated intent.

13. The method of claim 12, further comprising
performing, by the automated assistant, a function indicated by an intent associated with the result.

14. The method of claim 13, further comprising providing to the accessory information associated with the function performed by the automated assistant.

15. An accessory comprising:
a controller;
a user interface communicatively coupled to the controller, the user interface including an input device configured to receive a voice request;
a communication interface communicatively coupled to the controller, the communication interface configured to:
establish a communication channel between the accessory and a portable electronic device, wherein the accessory is configured to remotely control operations of the portable electronic device via an automated assistant executing on the portable electronic device,
wherein the portable electronic device and the accessory communicate through messages which are grouped into a general message set and an optional message set, wherein the general message set includes authentication messages to verify an identity and a capability of the portable electronic device or the accessory, and the optional message set comprising functionality information of the portable electronic device or the accessory, and wherein the portable electronic device or the accessory may be blocked from evoking certain or all of the optional messages if the authentication is unsuccessful;
wherein the automated assistant is an intelligent application facilitating interaction with the portable electronic device;
transmit, to the portable electronic device, an indication of a mode of the accessory;
transmit data associated with the voice request to the automated assistant executing on the portable electronic device; and
receive a report responsive to the voice request from the portable electronic device, wherein the report is received in accordance with the mode indicated by the accessory and the report includes one or more search results obtained by the automated assistant based on the voice request;

an output device of the user interface configured to present the report in accordance with the mode indicated by the accessory;

the user interface further configured to receive a selection of a result associated with the report; and the communication interface further configured to transmit the selected result to the automated assistant executing on the portable electronic device.

16. The accessory of claim 15, wherein the input device includes a microphone.

17. The accessory of claim 15, wherein the output device includes a display.

18. The accessory of claim 15, wherein the output device includes a speaker.

19. A portable electronic device comprising:

a processor;

a computer readable medium communicatively coupled to the processor, the computer readable medium having instructions therein executable by the processor, wherein the instructions include a set of instructions for an automated assistant;

wherein the automated assistant is an intelligent application facilitating interaction with the portable electronic device;

an accessory interface communicatively coupled to the processor, the accessory interface configured to:

establish a communication channel between an accessory and the portable electronic device, wherein the accessory is configured to remotely control operations of the portable electronic device via an automated assistant executing on the portable electronic device, wherein the portable electronic device and the accessory communicate through messages which are grouped into a general message set and an optional message set, wherein the general message set includes authentication messages to verify an identity and a capability of the portable electronic device or the accessory, and the optional message set comprising functionality information of the portable electronic device or the accessory, and wherein the portable electronic device or the accessory may be blocked from evoking certain or all of the optional messages if the authentication is unsuccessful;

receive a message indicating a mode of an accessory, and receive data associated with a request from the accessory; and the automated assistant configured to:

determine a task associated with the request;

perform the task; and generate a report including a plurality of results determined by performing the task, wherein the report is generated in accordance with the received mode of the accessory and the report includes one or more search results obtained by the automated assistant based on the request;

send the report to the accessory; and receive, from the accessory, a selection of a result associated with the report.

20. The portable electronic device of claim 19, further comprising a network interface, wherein the automated assistant obtains at least one result by accessing a network via the network interface.

21. The portable electronic device of claim 19, wherein the automated assistant obtains at least one result by accessing information stored in a storage device of the portable electronic device.

22. The portable electronic device of claim 19, wherein the automated assistant obtains at least one result by accessing information stored on a storage device of the accessory.

23. The method according to claim 1, wherein the search results are Internet search results.

24. The method according to claim 1, wherein the automated assistant facilitates user interaction with the portable electronic device and services provided by the portable electronic device.

25. The method according to claim 1, wherein the report is generated by the automated assistant by obtaining information stored remotely from the portable electronic device.

26. The method according to claim 1, wherein the voice request is recognized, parsed and analyzed by the automated assistant.

* * * * *